(12) United States Patent
Seki (10) Patent No.: US 7,321,819 B2
(45) Date of Patent: Jan. 22, 2008

(54) VEHICLE DECELERATION CONTROL DEVICE

(75) Inventor: Masato Seki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 526 days.

(21) Appl. No.: 11/038,604

(22) Filed: Jan. 21, 2005

(65) Prior Publication Data

US 2005/0171676 A1  Aug. 4, 2005

(30) Foreign Application Priority Data

Jan. 29, 2004  (JP) ............... 2004-020861
Dec. 13, 2004  (JP) ............... 2004-359729

(51) Int. Cl.
B60T 7/12  (2006.01)

(52) U.S. Cl. ............... 701/96; 701/301; 340/436; 340/903

(58) Field of Classification Search ............... 701/93, 701/96, 301; 340/435, 436, 903; 180/170, 180/179
See application file for complete search history.

(56) References Cited

U.S. PATENT DOCUMENTS

| 6,044,321 A * | 3/2000 | Nakamura et al. ............ 701/96 |
| 6,401,024 B1 | 6/2002 | Tange et al. |
| 6,473,681 B1 | 10/2002 | Eckert et al. |
| 6,618,000 B2 | 9/2003 | Winner et al. |
| 6,889,140 B2 * | 5/2005 | Isogai et al. ................ 701/301 |
| 2004/0167702 A1 * | 8/2004 | Isogai et al. .................. 701/96 |
| 2005/0168328 A1 * | 8/2005 | Kitterer et al. ............. 340/435 |
| 2006/0025918 A1 * | 2/2006 | Saeki .......................... 701/96 |

FOREIGN PATENT DOCUMENTS

| DE | 196 54 769 A1 | 7/1998 |
| DE | 198 27 445 A1 | 12/1998 |
| DE | 198 17 326 A1 | 10/1999 |
| DE | 100 11 777 A1 | 11/2000 |
| DE | 100 17 662 A1 | 10/2001 |
| JP | A 10-297451 | 11/1998 |
| JP | A 11-32404 | 2/1999 |
| JP | A 11-78600 | 3/1999 |
| JP | A 11-348746 | 12/1999 |
| JP | A 2000-355232 | 12/2000 |
| JP | A 2002-67904 | 3/2002 |

\* cited by examiner

Primary Examiner—Gary Chin
(74) Attorney, Agent, or Firm—Oliff & Berridge, PLC (57) ABSTRACT

A novel vehicle deceleration control device for ensuring a proper distance between a vehicle and a preceding vehicle, etc., equipped on a vehicle, automatically decelerates the vehicle by controlling braking force based on a target deceleration, calculated based on a relative distance and a relative speed between the vehicle and its preceding vehicle, etc., when automatic deceleration is required. The inventive device, however, will decelerate the own vehicle based on a maximum allowable deceleration when the magnitude of the target deceleration is larger than the magnitude of the maximum allowable deceleration, restricting the vehicle deceleration. The maximum allowable deceleration is determined based on the vehicle speed of the own vehicle when a predetermined condition is satisfied, and maintained at a constant or within a predetermined range, thereby enabling a driver to judge the necessity of braking operation by himself during restricting the vehicle deceleration more easily than ever.

14 Claims, 7 Drawing Sheets

VEHICLE DECELERATION CONTROL DEVICE

BACKGROUND OF THE INVENTION

1. Field of the Invention

This invention relates to a vehicle deceleration control device, and more specifically, to a vehicle deceleration control device that decelerates a vehicle through automatic braking force control.

2. Description of Prior Art

In the field of running control of a vehicle, such as automobile, it is known to execute deceleration control through which braking force or deceleration of a vehicle is automatically controlled based on a relative distance and a relative speed between the vehicle and its preceding vehicle or other objects in the front of the vehicle (referred to as a preceding vehicle etc. in the followings), ensuring a proper distance between the vehicle and its preceding vehicle, etc. Devices executing such deceleration control (or acceleration-and-deceleration control), for example, are shown in Japanese Patent Laid-Open Publications Nos. 2000-355232, 11-348746, 2002-67904, 10-32404, 10-297541 and 11-78600.

During automatic deceleration control as described above, a rapid speed change of a vehicle could deteriorate its driving and riding comfort. Thus, in order to prevent such a rapid change in a vehicle speed, JP 2000-355232 proposes to restrict the magnitude of a deceleration of the vehicle to a predetermined limit value. In this publication, because of the fact that the stronger braking force is required for ensuring a proper distance between vehicles as the vehicle speed increases, the limit value for the magnitude of a deceleration in the automatic control is also changed with the vehicle speed. In the other examples, JP 0.11-348746 and 2002-67904 disclose to limit the changing rate of a deceleration induced with automatic control, thereby suppressing rapid and/or frequent variation of a vehicle speed. In JP10-32404, 10-297541 and 11-78600, there are disclosed structures for suppressing a rapid change in braking and driving force at an end of automatic control owing to acceleration or deceleration (braking) actions of a driver during the execution of the automatic control.

By the way, even during deceleration control of an automatic control device as described above, a driver will execute a braking action (e.g., through depressing a brake pedal) to reduce the speed of his own vehicle at a deceleration higher than that provided by the automatic control when his vehicle becomes too close to a preceding vehicle, etc. Especially when a deceleration applied to a vehicle through automatic control is prevented from exceeding its limit value as in the devices of JP 2000-355232 and 11-348746, the deceleration or braking force applied through the automatic control is liable to be insufficient, increasing occasions in which a driver should judge by himself if still higher braking force is required. This is because the magnitude of an actually applied deceleration will be smaller than the magnitude of a target value of deceleration determined based on a relative distance and a relative speed between the own vehicle and the preceding vehicle, etc., i.e. the magnitude of deceleration required for ensuring a proper distance between the vehicles. Conventional vehicle deceleration control devices as shown in the above-mentioned publications however, rarely consider enabling a driver to judge the necessity of braking operation easily.

In more detail of this respect, for instance, in the device of JP 2000-355232, since a limit value for a deceleration is changed (reduced) together with reduction of the vehicle speed of its own vehicle through automatic deceleration control, it is difficult for a driver to estimate how much braking force will be applied through the automatic control. Due to this lowering of the restricted deceleration together with the reduction of the vehicle speed, a driver who experienced that high deceleration was allowed in accordance with a high vehicle speed at the time of the start of deceleration control may expect further deceleration through automatic braking, and thereby the starting of braking operation can be delayed. Especially when a large difference arises between the limit value for deceleration and a target value of deceleration determined based on a relative distance and a relative speed between a vehicle and an object in the front of the vehicle (a target deceleration) where the actual deceleration applied on the own vehicle becomes insufficient, the distance between the vehicles can be reduced unexpectedly for the driver.

Accordingly, conventional vehicle deceleration control devices may be improved for enabling a driver to judge the necessity of braking action more easily without inducing deterioration of driving and riding comfort.

SUMMARY OF INVENTION

It is one object of the present invention is to provide a novel vehicle deceleration control device for ensuring a proper distance between its own vehicle and a preceding vehicle, etc., which device is so constructed to suppress a rapid change of the vehicle speed without deteriorating driving and riding comfort.

It is another object of the present invention is to provide such devices that suppress a rapid speed change by limiting the magnitude of deceleration applied through automatic control, which device is so constructed to enable a driver to judge easily a shortage of braking force to be applied actually on his own vehicle.

According to the present invention, there is provided a novel vehicle deceleration control device for ensuring a proper distance between a vehicle and a preceding vehicle, etc., which device suppresses a rapid change in the vehicle speed while enabling a driver to judge the necessity of braking operation by himself more easily than ever. The inventive device equipped on a vehicle judges automatic deceleration to be necessary based on a relative distance and a relative speed between the vehicle and preceding vehicle, etc. as in a conventional device. Then, when it is judged the automatic deceleration is required, the device calculates a target deceleration of the own vehicle based on the relative distance and relative speed and automatically decelerates the vehicle by controlling braking force based on the target deceleration. The inventive device, however, will decelerate the own vehicle automatically by controlling braking force based on a maximum allowable deceleration when the magnitude of the target deceleration is larger than the magnitude of the maximum allowable deceleration. The maximum allowable deceleration is determined based on the vehicle speed of the own vehicle when a predetermined condition is satisfied. Accordingly, the inventive device further comprises a speed detector for detecting a vehicle speed of the own vehicle and a maximum allowable deceleration setting portion setting up the maximum allowable deceleration as described.

As noted, a deceleration appropriate for suppressing a rapid change in a vehicle speed varies dependent upon the vehicle speed, and thus, preferably, a limit value for a deceleration applied through the automatic control is determined based on the vehicle speed. In a conventional device, under conditions that the increase of a magnitude of an actually applied deceleration is restricted, the variation of a limit value for the actually applied deceleration together with a vehicle speed makes it difficult for a driver to expect the magnitude of a deceleration or braking force induced through the automatic control.

According to the present invention, however, a maximum allowable deceleration is set up based on a speed of the own vehicle when a predetermined condition is satisfied. Then, the maximum allowable deceleration so determined is used as a limit value for a deceleration actually applied on the own vehicle when the magnitude of the deceleration is to be restricted, i.e. when a magnitude of a target deceleration is larger than the magnitude of the maximum allowable deceleration. Thus, the limit value for braking force is maintained irrespective of the vehicle speed reduction, enabling a driver to expect easily the magnitude of braking force generated through the automatic control (the range of automatic deceleration control to support driver's braking operation) and thereby to judge the necessity for braking action more easily, while reducing situations where braking force becomes insufficient unexpectedly for the driver. In this connection, while a magnitude of a target deceleration is larger than a magnitude of a maximum allowable deceleration, the maximum allowable deceleration may be kept constantly on a value at the time of its setup. However, it should be realized that a maximum allowable deceleration may be varied, depending upon running conditions of its own vehicle, within a predetermined range unless the amplitude of its variation is contrary to a driver's expectation for available braking force.

The above-described predetermined condition to be satisfied, most simply, may be considered as a start condition of execution of automatic deceleration. In this case, a maximum allowable deceleration is defined based on the speed of the own vehicle on the start of automatic deceleration. Since the magnitude of the maximum available braking force through the automatic deceleration control is set to a constant or a value within a predetermined range at the beginning of a certain one execution of automatic deceleration, the grasping of the magnitude of braking force available in the automatic deceleration control becomes easy for a driver.

In an alternative aspect of the setup of a maximum allowable deceleration, the maximum allowable deceleration setting portions may be so constructed to set, to the maximum allowable deceleration, an allowable deceleration determined based on a vehicle speed of the own vehicle of a time when the magnitude of the target deceleration increases to the magnitude of the allowable deceleration for the first time after the starting of automatic deceleration. Here, the allowable deceleration is defined as an amount corresponding to a deceleration appropriate for suppressing a rapid change in the vehicle speed, sequentially determined based on an actual speed of the own vehicle during automatic deceleration control. After the starting of automatic deceleration, the restriction of deceleration actually generated on a vehicle becomes effective on the first time of the magnitude of the target deceleration exceeding the magnitude of the allowable deceleration. Thus, by setting the allowable deceleration to the maximum allowable deceleration at a time when the magnitude of the target deceleration increases to the magnitude of allowable deceleration for the first time after the starting of the automatic deceleration, the maximum allowable deceleration is rendered more appropriate for the actual vehicle speed. (Accordingly, in this case, the time of a predetermined condition being satisfied is the first time when the magnitude of target deceleration increases to the magnitude of the allowable deceleration after the starting of the automatic deceleration.)

In an alternative aspect of the setup of a maximum allowable deceleration, the maximum allowable deceleration setting portions may be so constructed to set, to the maximum allowable deceleration, an allowable deceleration determined based on a speed of the own vehicle when the magnitude of the target deceleration increases to the magnitude of the allowable deceleration. (Accordingly, in this case, the time of a predetermined condition being satisfied is the time of the magnitude of the target deceleration increasing to the magnitude of the allowable deceleration.) As noted, it is during the restricting of the deceleration that a large variation of a limit value for a deceleration renders actually generated deceleration liable to be insufficient and makes the grasping of braking force available through the automatic deceleration difficult for a driver. Thus, by maintaining a limit value for deceleration at a constant or within a predetermined range at least during the restricting of the deceleration, it will be significantly easier for a driver to grasp braking force which can be generated in the automatic deceleration, as compared with prior art.

In this regard, during one execution of automatic deceleration control, the speed of the own vehicle is changed and the target deceleration increases and decreases depending upon the relative distance and/or relative speed between the vehicles. Thus, it is possible that the magnitude of the target deceleration, after having exceeding beyond and descending below the maximum allowable deceleration or allowable deceleration once, exceeds the allowable decelerations again (the magnitude of the target deceleration alternates between the upper and lower regions of the allowable deceleration). When the magnitude of the target deceleration, after the restriction of the deceleration is released once, exceeds the allowable deceleration which is changed together with the vehicle speed, the allowable deceleration corresponding to the current vehicle speed is more appropriate as the limit value for deceleration. Accordingly, to set an allowable deceleration determined based on a vehicle speed of the own vehicle to a maximum allowable deceleration each time a magnitude of a target deceleration increases to a magnitude of the allowable deceleration provides a driver easiness of grasping braking force available in the automatic control while ensuring the effects of suppressing a rapid change in the vehicle speed.

In the above-mentioned present invention, a magnitude of a limit value for a deceleration, i.e., a maximum allowable deceleration or an allowable deceleration, is preferably set to be larger when a vehicle speed is higher as compared with a magnitude of a limit value when the vehicle speed is lower, and more preferably to be larger as the vehicle speed increases. In this case, the magnitude of the limit value is set to be the highest value in accordance with the highest speed at the start of one execution of automatic control or restriction of deceleration (The speed of the vehicle is gradually reduced under automatic deceleration control except for a special situation.). Thus, since the generation of braking force is ensured up to the level having been set up on the start of one execution of automatic control or restriction of deceleration even if the vehicle speed is lowered, the anticipation in a driver, "probably, already generated deceleration will continue." will be satisfied. In this connection, as noted, the predetermined range in which the maximum allowable deceleration is allowed to vary should not be contrary to the anticipation or expectation of a driver for braking force available under the automatic control. Thus, for instance, the width of a predetermined range may be smaller than a magnitude of a difference of magnitudes between the maximum allowable deceleration or allowable deceleration at a time of its setup and the maximum allowable deceleration or allowable deceleration determined based on a current vehicle speed of the own vehicle.

By the way, an excessively rapid change of a target deceleration or an actual deceleration could cause a braking force or deceleration shock on a vehicle, deteriorating its driving and riding comfort. A rapid change in a deceleration would also induce a rapid change of a vehicle speed. Thus, the inventive device may further comprises a portion setting up a maximum allowable incremental gradient of a magnitude of a deceleration based on a speed of the own vehicle upon a start of deceleration of the own vehicle through an automatic braking force control; and a portion modifying the target deceleration to render the incremental gradient of the target deceleration equal to the maximum allowable increment gradient when the magnitude of the incremental gradient of the magnitude of the target deceleration is larger than the magnitude of the maximum allowable increment gradient; and whereby the own vehicle may be automatically decelerated by controlling braking force based on the modified target deceleration. The maximum allowable incremental gradient (MAIG) corresponds to a maximum of an incremental gradient of a magnitude of a deceleration appropriate for suppressing a rapid change in a deceleration, determined dependent upon a vehicle speed. In this case, accordingly, the inventive device suppresses a rapid change in a deceleration beyond MAIG determined appropriately based upon the speed of the own vehicle, and in turn, any excessively larger shock of braking force or deceleration.

Regarding the magnitude of MAIG, in more detail, because it is preferable to decelerate a vehicle running in a high speed range as quickly as possible, a magnitude of MAIG is preferably set to be larger when the speed of an own vehicle is higher as compared with that when the speed of the own vehicle is lower, and more preferably to be larger as the speed of the own vehicle increases. Further, the reduction of the changing rate or gradient of deceleration beyond a driver's anticipation would be contrary to his expectation that the deceleration would increase, causing a delay of his braking action. Thus, MAIG is set up based upon the speed of his own vehicle at the start of deceleration induced through the automatic braking control (the highest speed during a normal automatic deceleration control).

Furthermore, in the present invention, it is not desirable that automatic deceleration control is contrary to a driver's intention. Thus, the automatic braking force control may be forbidden when a predetermined action by a driver is detected. The predetermined operation may be driver's acceleration and/or braking actions.

The inventive device can be considered as a vehicle deceleration control device mainly for assisting a driver to execute an appropriate braking action without deteriorating driving and riding comfort, while ensuring a proper distance between the own vehicle and a preceding vehicle, etc. and enabling the driver to judge necessity of braking action more easily than ever. In other words, according to the present invention, the advantages of the automatic deceleration control to support and assist a driver's braking action are made fully effective.

In the present invention, as noted, under the restriction of increase of a deceleration, braking force is not reduced even if a vehicle speed varies, because the maximum allowable deceleration is kept at a constant or within a predetermined range. This is advantageous in that, during the restricting of a deceleration, a driver can make a judgment of whether a braking operation is executed or not based on the deceleration or the braking force that he has felt until then. In the present invention, although the changing rate of the vehicle speed becomes larger in the absence of reduction of braking force, the driver and passengers feel no deterioration of driving and riding comfort because the deceleration is simply maintained at a level the driver has already felt during the restricting of deceleration. Rather, as in a case of an conventional device, the delay of a driver's judgment for braking operation could cause a sudden braking operation, resulting in getting worse riding comfort and driver's feeling.

Further, in the case of the inventive device in which the magnitude of the maximum allowable deceleration or allowable deceleration is set to be larger when the speed of an own vehicle is higher as compared with that when the speed of the own vehicle is lower, the automatic control becomes much safer because large braking force is allowed during the restriction of a deceleration by making the maximum allowable deceleration or allowable deceleration consistent with high speed at the start of automatic control or restriction of a deceleration. That is, high braking force can be maintained even during automatic deceleration control and/or restriction of deceleration, and consequently, the speed of the own vehicle will be reduced effectively, which is advantageous to prevent a vehicle from being too close to its preceding vehicle, etc., and to ensure of a proper distance between the vehicles quickly.

Other objects and advantages of the present invention will be in part apparent and in part pointed out hereinafter.

BRIEF DESCRIPTION OF THE DRAWINGS

In the accompanying drawings.

DESCRIPTION OF PREFERRED EMBODIMENTS

Figure 1:
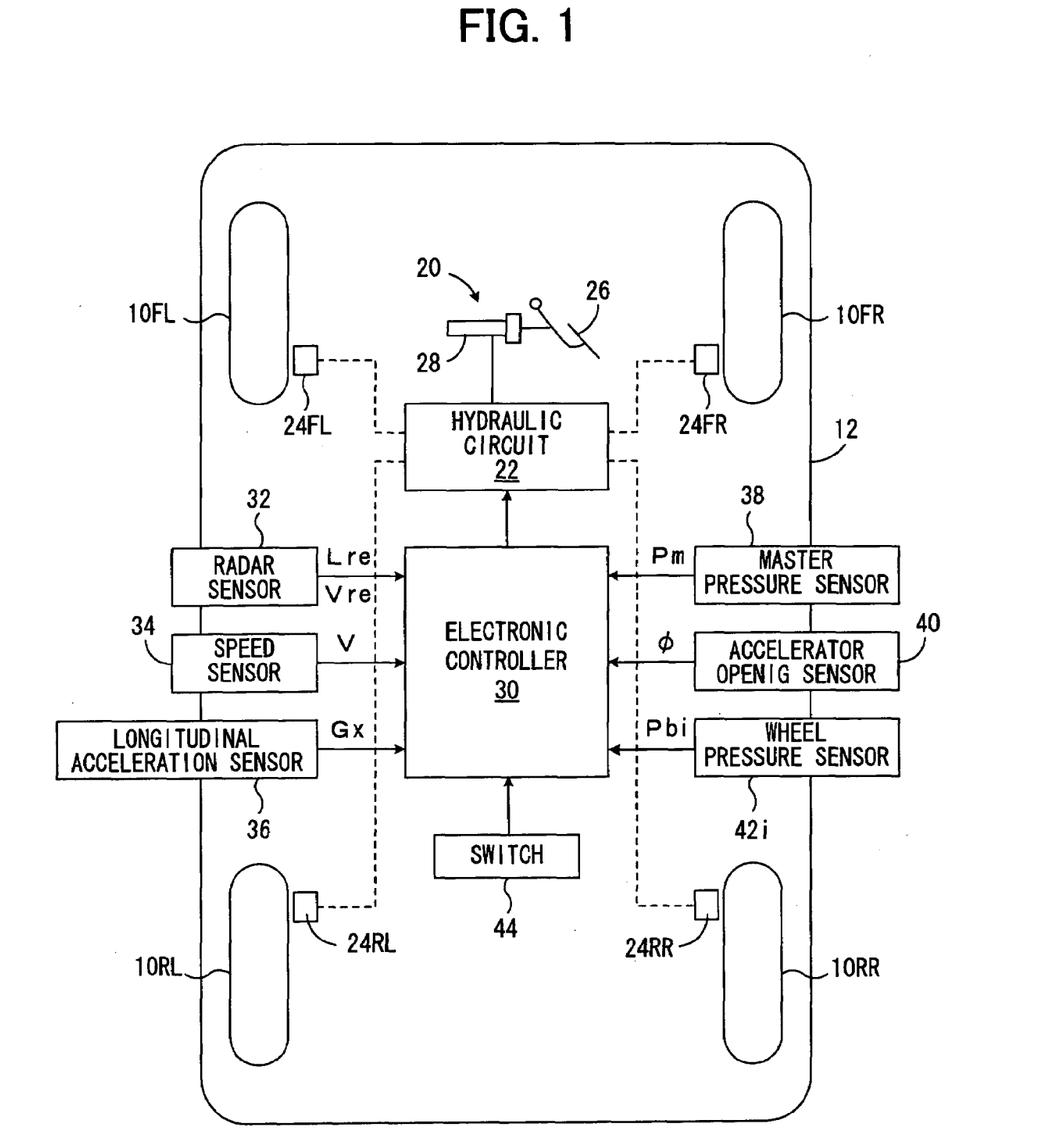
FIG. 1 is a diagrammatical view of one embodiment of a four wheeled, rear drive vehicle incorporating a vehicle deceleration control device according to the present invention.

FIG. 1 diagrammatically shows a vehicle incorporating a preferred embodiment of a vehicle deceleration control device according to the present invention. In this drawing, a vehicle 12 has left and right front wheels (driven wheels) 10FL and 10FR, left and right rear-wheels (driving wheels) 10RL, 10RR. Front wheels 10FL, 10FR each are steered through tie rods with a rack-and-pinion-type power-steering device actuated in response to the rotation of a steering wheel (not shown) by a driver. A braking system 20, generating braking force on each wheel, has a hydraulic circuit 22 comprising a reservoir, an oil pump and various valves, etc. (not shown), wheel-cylinders 24FL, 24FR, 24RL and 24RR, equipped on the respective wheels, and a master cylinder 28 actuated in response to the depression of a brake pedal 26 by the driver. In the braking system, a braking pressure in each wheel cylinder, and in turn, the braking force on each wheel, are adjusted through the hydraulic circuit 22 in response to a master cylinder pressure. As explained in detail later, the braking pressure in each wheel cylinder is also controlled by an electronic control 30, when required.

On the vehicle 12, installed are a radar sensor 32, using electric waves such as millimeter waves and/or laser light, for detecting any presence of preceding vehicles, etc., a relative distance Lre and a relative speed Vre between the vehicle 12 and the preceding vehicle, etc. if any; a speed sensor 34 for detecting speed V of the vehicle 12; a longitudinal acceleration sensor 36 for detecting a longitudinal acceleration Gx; a pressure sensor 38 for detecting a master cylinder pressure Pm; an accelerator opening sensor 40 for detecting an accelerator opening Φ, e.g., through the depression amount of an accelerator pedal. Further, on the wheel-cylinders 24FR-24RL, there are provided the respective pressure sensors 42$i$ (i=fl, fr, rl, rr) for detecting the pressures Pbi (i=fl, fr, rl, rr) in the wheel-cylinders 24FR-24RL as the braking pressures of the respective wheels.

Electronic controller 30 processes the signals from the series of above-mentioned sensors, and, when any preceding vehicle etc. is detected, controls braking force on each wheel, i.e., the deceleration of the vehicle, through the hydraulic circuit 22 for ensuring a proper distance of the vehicle from the preceding vehicle, etc. The electronic controller 30, operated by closing a switch 44, may be of an ordinary type, including a microcomputer having CPU, ROM, RAM, and input/output port devices, interconnected with the bidirectional common bus, and drive circuits. As seen from FIG. 1, inputted to the controller 30 are a signal indicating a relative distance Lre and a relative speed Vre, detected by the radar sensor 32; a signal indicating a vehicle speed V, detected by the speed sensor 34; a signal indicating the vehicle longitudinal acceleration Gx, detected by the longitudinal acceleration sensor 36; a signal indicating a master cylinder pressure Pm, detected by the pressure sensor 38; a signal indicating an accelerator opening φ, detected by the accelerator opening sensor 40; and signals indicating braking pressures Pbi of the respective wheels, detected by the corresponding pressure sensors 42$i$. In this connection, any signals showing any other operational status of the vehicle, detected by arbitrary sensors, may be inputted into the electronic controller 30, and it should be understood that such a case belongs to the scope of the present invention.

In general, the inventive device as mentioned above executes deceleration control as follows. First, whether any preceding vehicle or other object exists ahead of the own vehicle or not is judged based on the signal from the radar sensor 34. If any preceding vehicle etc. is detected, a value of a target deceleration, i.e. a deceleration of the own vehicle required for ensuring a proper distance of the own vehicle from the preceding vehicle, etc., is determined based on the relative distance and relative speed measured from the preceding vehicle etc. Then, if automatic deceleration control is needed, in principle, a demand of generating braking force is provided through the hydraulic circuit 22 to each of the wheels so as to decrease the vehicle speed at the determined target deceleration. However, the magnitude of a deceleration and its incremental gradient, actually generated on the vehicle, are each prohibited from exceeding the respective limit values determined based on a speed of the own vehicle, and thereby, a rapid change of the vehicle speed and/or deceleration or braking force will be prevented.

With respect to the control of the deceleration, it should be noted that the restriction of an incremental gradient of a deceleration actually applied on the vehicle induces a difference between a target deceleration, determined based on a relative distance and a relative speed, and "a target value" of a deceleration to be actually generated on the vehicle once the changing rate or gradient of the target deceleration exceeds the corresponding limit value. In order to ensure a proper relative distance, the difference between the "target value" of the actual deceleration and the target deceleration should be decreased as promptly as possible, making the actual deceleration coincide with the target deceleration. Thus, in the embodiment illustrated below, an incremental gradient of a magnitude of a target value of a deceleration to be generated actually on the own vehicle (namely, an increment, per predetermined time, of the magnitude of deceleration actually generated on the own vehicle) is given by the difference between the target value of the deceleration already generated now (or already demanded to be generated) and the target deceleration determined newly, namely, after the demanding of the currently generated deceleration.). Then, the difference, namely, the increment per predetermined time of the magnitude of the deceleration actually generated on the own vehicle will be suppressed below a limit value. In this strategy, once a difference arises between a target value of an actual deceleration and a target deceleration, the former will be made vary at the limit value for the gradient of the magnitude of the deceleration until the target value of the actual deceleration reaches the target deceleration. Accordingly, an actually generated deceleration can follow a target deceleration as promptly as possible without changing rapidly. In the following, a target value of a deceleration to be actually generated on the own vehicle is referred to as a "control target deceleration", and a limit value for an incremental gradient of a magnitude of a deceleration is referred to as a "maximum allowable increment gradient" (MAIG).

As for the restriction of a magnitude of a deceleration, a magnitude of a target value actually generated on the own vehicle (control target deceleration) will also be prohibited from exceeding a limit value determined based on the speed of the own vehicle, and thereby, a rapid change in the vehicle speed is suppressed. As illustrated in detail below, in the present invention, once a magnitude of a control target deceleration reaches and exceeds the limit value, the limit value will be kept at a constant or within a predetermined range until the magnitude of the target deceleration descends below the limit value (at that time, the target deceleration and control target deceleration coincides with each other.). This feature enables a driver to recognize easily the magnitude of braking force which can be generated during automatic deceleration control, while providing the other various advantageous effects as described in Summary of Invention.

Hereinafter, advantageous operations of the inventive device will be explained with reference to several exemplary control routines. In the following explanations, the acceleration and deceleration of a vehicle are defined as positive and negative, respectively. Accordingly, all of deceleration values and their various limit values are defined as negative values. Magnitudes of decelerations and other parameters are equivalent to the absolute values of the respective parameters.

Figure 2:
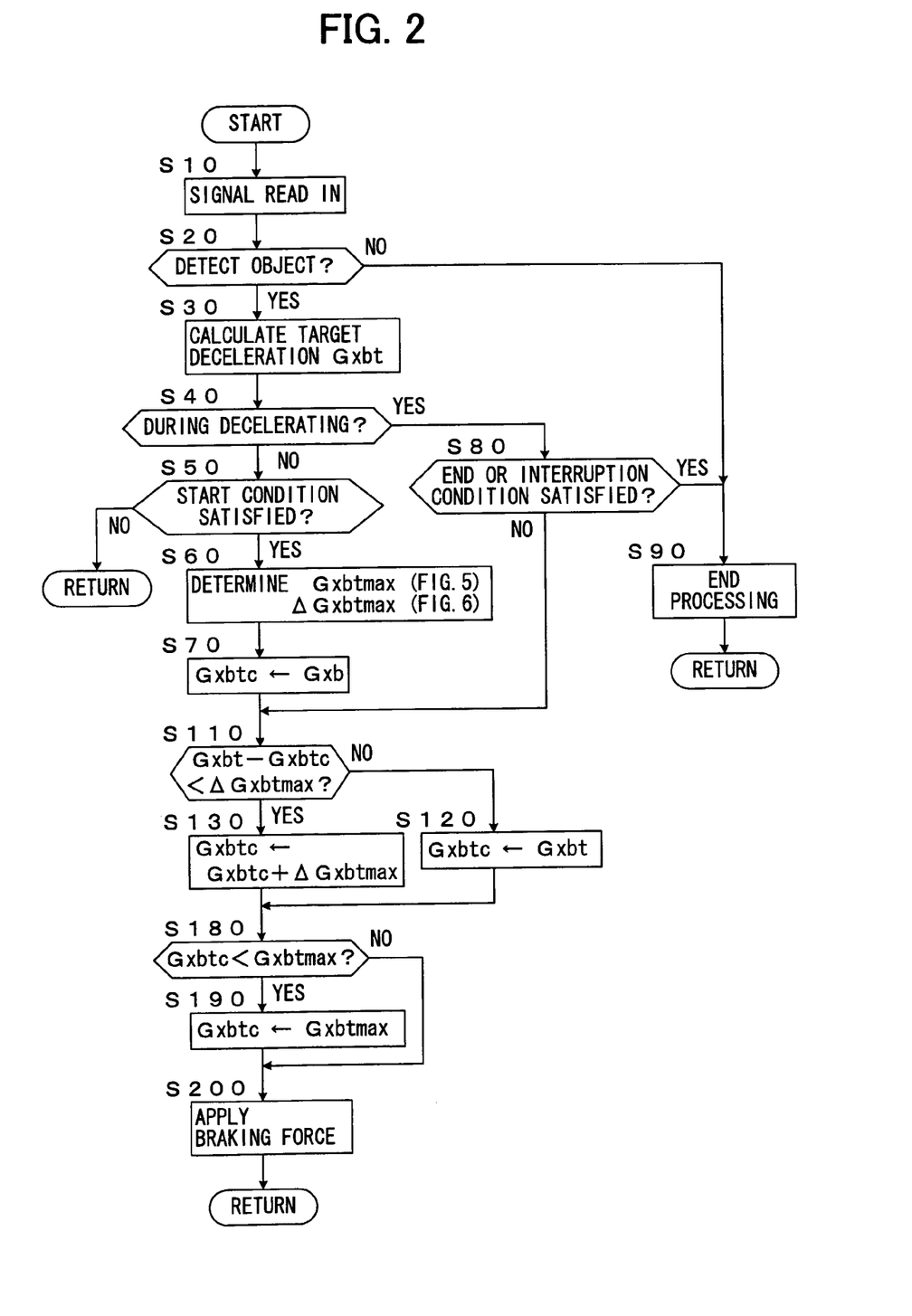
FIG. 2 is a flowchart showing a first exemplary deceleration control routine in a control device of an embodiment according to the present invention.
Figure 8:
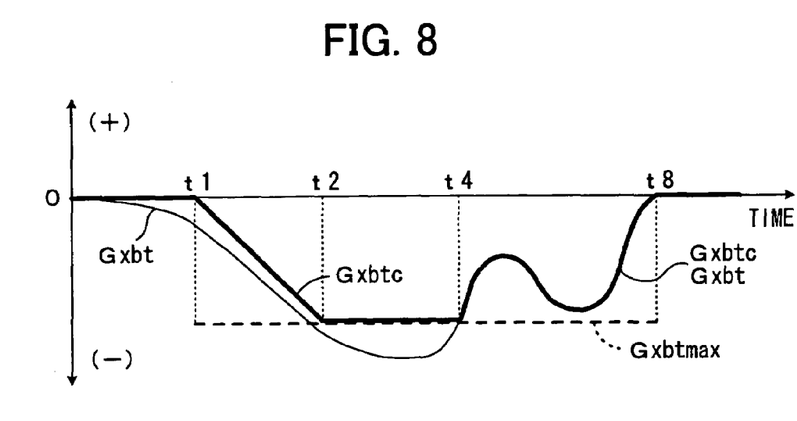
FIG. 8 shows an example of a time chart of a target deceleration, a control target deceleration and a maximum allowable deceleration in the first control routine.

The flow chart in FIG. 2 shows the first exemplary control routine of the automatic deceleration control of the present invention, and FIG. 8 is a time chart example of a deceleration actually applied on the own vehicle (equipped with the inventive device) under deceleration control in accordance with the control routine of FIG. 2. In FIG. 8, a target deceleration Gxbt determined based on a relative speed Vre and a relative distance Lre of a preceding vehicle, a control target deceleration (a target value of an actual deceleration) Gxbtc, and a maximum allowable deceleration Gxbtmax are shown with a thin solid line, a thick solid line and a broken line, respectively. As seen from FIG. 8, in this control routine, the maximum allowable deceleration Gxbtmax, i.e. the limit value for the magnitude of the actual deceleration, is set up based on the speed of the own vehicle on the start of execution of automatic deceleration (t1: when the control target deceleration Gxbtc starts incrementing in the negative direction), and maintained until the execution of the automatic deceleration is completed (t8). (That is, in this control routine, the time of the start of one automatic deceleration is selected as the time of a predetermined condition being satisfied.) As shown, the control target deceleration Gxbtc is prohibited from exceeding the maximum allowable deceleration Gxbtmax (that is, a braking force is given based on the maximum allowable deceleration.) while the target deceleration Gxbt is over the maximum allowable deceleration Gxbtmax in the negative direction (from t2 to t4).

With reference to FIG. 2, in response to the closure of switch 44, the control routine is started and repeatedly executed every predetermined time (for example, several milliseconds) until the opening of the switch 44. After starting the control routine, first, the series of the above-mentioned signals are read in (step 10), and it is judged if any preceding vehicle, etc. exists based on the signals from the radar sensor 32 (step 20). If no preceding vehicle, etc. is detected, an end process is performed in step 90 and the next control routine cycle is started.

When a preceding vehicle, etc. is detected, a target deceleration Gxbt is calculated based upon a relative distance Lre and a relative speed Vre, determined from signals from the radar sensor 32 in step 30, using the following expression, for example:

$$Gxbt = f(|Lre/Vre|),$$

where |Lre/Vre| is an amount, called "a degree of approachability", being lowered as Lre (>0) reduces or as the absolute value of Vre (<0) increases (the relative speed Vre is given by Vre=Vf−Vs, where Vf and Vs are the speeds of the preceding vehicle and the own vehicle, respectively.). The magnitude (absolute value) of Gxbt is calculated as a function increasing with the degree of approachability being lowered. It should be understood that the magnitude and its gradient of the target deceleration are able to become so large as to cause a rapid change of the speed and/or braking force of the own vehicle because the target deceleration is a target value of a deceleration required for ensuring a proper relative distance dependent upon the relative distance Lre and relative speed Vre. Thus, as described below, for the purpose of preventing a rapid change of the speed and/or braking force, a control target deceleration actually demanded to the braking system 20 differs from the target deceleration when the magnitude and the gradient of the target deceleration are too large.

Subsequently, in step 40, it is judged if braking force has been generated through automatic braking control. If not, it is judged in step 50 if any one of start conditions for executing automatic deceleration is satisfied, i.e. if the application of braking force through automatic control is required for ensuring a safe relative distance and relative speed with respect to the preceding vehicle, etc. For instance, start conditions may be judged as satisfied when either of the following conditions is satisfied under conditions that neither acceleration nor braking is executed by the driver:

(1) Vre<0 and |Lre/Vre|<LVres (a positive reference for the starting of automatic deceleration);

(2) A degree of approachability can be normally calculated; and/or (3) Gxbt<Gxbt0 (a negative predetermined value).

Alternatively, it may be judged that a start condition for automatic application of braking force is satisfied when the relative speed Vre is negative and the relative distance Lre is below a reference value Los (a positive value, calculated to be smaller as the magnitude of the relative speed increases). It should be understood by one of ordinary skilled in the art that the judgment of start conditions may be done by any other arbitrary way based on the relative distance Lre and relative speed Vre. If none of start conditions is satisfied, the control routine reruns to Start.

Figure 5:
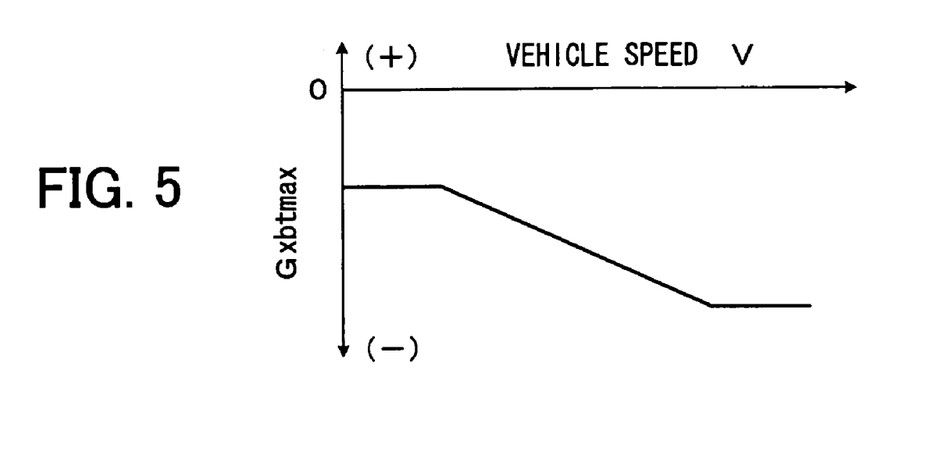
FIG. 5 shows the relation between a vehicle speed V and a maximum allowable deceleration Gxbtmax (a map for determining the maximum allowable deceleration Gxbtmax as a function of a vehicle speed V)
Figure 6:
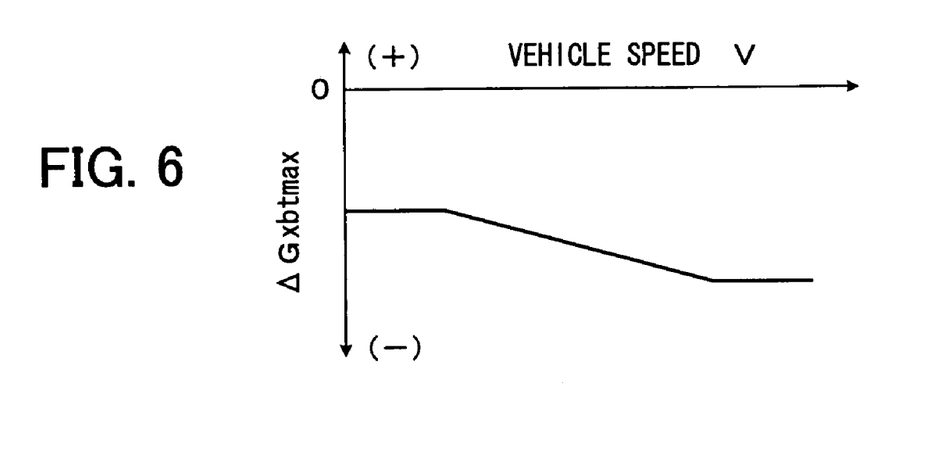
FIG. 6 shows the relation between a vehicle speed V and a maximum allowable incremental gradient $\Delta$Gxbtmax (a map for determining the maximum allowable incremental gradient $\Delta$Gxbtmax as a function of a vehicle speed V)

When a start condition is satisfied, a maximum allowable deceleration Gxbtmax (<0) and MAIG ΔGxbtmax (<0) are calculated in step 60 based upon the current vehicle speed V, using maps as shown in FIGS. 5 and 6, respectively. Namely, the maximum allowable deceleration Gxbtmax, a limit value for a deceleration to be actually generated on the own vehicle (target deceleration or control target deceleration), is determined based upon the vehicle speed V when any start condition for execution of automatic deceleration control is satisfied, i.e. when the automatic deceleration control is about to start (t1 in FIG. 8), and maintained until one automatic deceleration control has been completed (t8 in FIG. 8). MAIG ΔGxbtmax, a limit value for a gradient of a control target deceleration (as noted, a gradient of a control target deceleration is the difference between a newly determined target deceleration and a control target deceleration having been set up currently), is determined based upon the speed V at the time of the starting of the automatic deceleration control, and maintained until the completion of the automatic deceleration control, similarly to the maximum allowable deceleration, Gxbtmax. As seen from FIGS. 5 and 6, the magnitudes (absolute values) of the maximum allowable deceleration Gxbtmax and MAIG ΔGxbtmax each are set to be larger as the vehicle speed V increases.

Further, when a start condition for execution of deceleration through automatic control is satisfied, the current deceleration Gxb of the own vehicle is set up as an initial value of the control target deceleration Gxbtc in step 70 (In the example of FIG. 8, the initial value (t1) of Gxbtc is 0. However, coasting deceleration derived from engine brake, if arising significantly, may be substituted to the initial value of Gxbtc.). In this connection, referring to the term from t0 to t1 in FIG. 8, there is shown that, while the target deceleration Gxbt varies in the negative direction, the control target deceleration has not varied until the point t1. This is because, in the control routine, although the target deceleration Gxbt will be calculated in response to the detection of any preceding vehicle etc. (t0), the deceleration control is not executed if a start condition of deceleration execution is not satisfied.

As seen from FIG. 2, the steps 50, 60, and 70 are executed on starting of automatic deceleration control (in a cycle in which deceleration is executed for the first time) only. When the deceleration control is already executed, steps 110-200 are repeated to control braking force based upon a control target deceleration determined every cycle as long as no end or interruption condition (as described later) is satisfied after step 40.

In steps 110-130, by using the target deceleration Gxbt, a control target deceleration is determined such that the incremental gradient of its magnitude will not exceed MAIG ΔGxbtmax.

First, in step 110, it is judged if the difference between the target deceleration Gxbt and the deceleration being actually generated (or the initial value of control target deceleration), i.e. the magnitude of the increment bringing the current control target deceleration to the target deceleration, is larger than the magnitude of MAIG ΔGxbtmax, i.e. if it is satisfied:

$Gxbt - Gxbtc < \Delta Gxbtmax$; or $|Gxbt - Gxbtc| > |\Delta Gxbtmax|$.

If not, the magnitude of the increment is smaller than the magnitude of MAIG ΔGxbtmax, and thus, the target deceleration is set as the new control target deceleration (step 120). If, however, Gxbt−Gxbtc<ΔGxbtmax is satisfied, the magnitude of the increment is larger than the magnitude of MAIG ΔGxbtmax, and thus, MAIG ΔGxbtmax is set as the variation amount of the control target deceleration. That is, the new control target deceleration is given by Gxbtc+ΔGxbtmax (step 130). Accordingly, the changing rate of the control target deceleration Gxbtc will be restricted to MAIG ΔGxbtmax.

Subsequently, in steps 180 and 190, the magnitude of the newly determined control target deceleration Gxbtc is restricted to the magnitude of the maximum allowable deceleration Gxbtmax. More in detail, in step 180, it is judged if the control target deceleration Gxbtc determined in step 120 or 130 is lower than the maximum allowable deceleration Gxbtmax. If Gxbtc<Gxbtmax is satisfied, the maximum allowable deceleration Gxbtmax is set as Gxbtc in step 190. Thus, Gxbtc, reset to the maximum allowable deceleration Gxbtmax, is used for controlling braking force in step 200. When Gxbtc<Gxbtmax is not satisfied, the control target deceleration Gxbtc determined by step 120 or 130 is used for controlling braking force in step 200.

With reference to FIG. 8 again, the variations of values of decelerations involved in the repetitive executions of steps 30, 110-200 will be explained below. At the point t1 when a start condition for execution of automatic deceleration is satisfied, a large difference (as compared with the absolute value of MAIG ΔGxbtmax) has arisen between the control target deceleration Gxbtc and the target deceleration Gxbt because the target deceleration Gxbt has varied in the negative direction earlier. Thus, the control target deceleration Gxbtc will vary in the negative direction at MAIG ΔGxbtmax for reducing the difference to follow the target deceleration Gxbt (step 130). However, after the control target deceleration Gxbtc reaches the maximum allowable deceleration Gxbtmax at the point t2, the control target deceleration Gxbtc will be kept at the maximum allowable deceleration Gxbtmax, namely, the increment of the magnitude of the control target deceleration Gxbtc will be restricted even if the target deceleration Gxbt keeps varying in the negative direction. When the target deceleration turns to vary into the positive direction (i.e., the magnitude of target deceleration starts to reduce) within the term t2-t4, and returns back to the maximum allowable deceleration Gxbtmax, the control target deceleration Gxbtc will start to vary with the target deceleration Gxbtc.

In the example of FIG. 8, it should be noted that, although not shown, the vehicle speed V also falls down throughout the term between t1 and t8 because of the execution of deceleration. Thus, supposing that the limiting value for the deceleration would vary with the vehicle speed as in prior art, braking force would decrease in the term of t2-t4, even if the target deceleration increases (more powerful braking force is requested), which would not suit the purpose for ensuring a proper relative distance through the automatic control. Moreover, during restricting the deceleration increase, the actual deceleration or braking force is liable to be insufficient. Under circumstances, the reduction of braking force together with the descending limit value would be contrary to the expectation of a driver who has experienced the increase of braking force in the term of t1-t2. According to the present invention, on the other hand, the maximum allowable deceleration Gxbtmax is set up in t1, and is maintained until t8, as shown in FIG. 8. Thus, advantageously, no reduction of braking force occurs during the restriction of deceleration, enabling a driver to grasp the magnitude of braking force that will be generated or maintained from now on and/or the range of braking support of the automatic control.

Again, with reference to FIG. 2, controlling the braking system 20 is executed in step 200 to adjust braking pressures Pbi (i=fl, fr, rl, rr) of the respective wheels for generating braking force based upon the control target deceleration determined as described above. Target braking pressure Pbti of each wheel may be given by the following formula, for example:

$\Delta Pbt = \alpha \cdot (Gxbtc - Gxb)$ $Pbti = Pbi + Ki \cdot \Delta Pbt$ where Pbi (i=fl, fr, rl, rr) is an actual braking pressure for each wheel; ΔPbt, a target value of variation of braking pressure of the vehicle body; α, a conversion factor (<0); and Ki, distribution coefficients of braking pressures to the respective wheels. It should be understood that braking pressure control may be done in other ways.

The automatic deceleration executed as described above is ended if a predetermined end condition or interruption condition is satisfied. The judgment of these end or interruption conditions is executed in step 80 after the judgment in step 40 that automatic deceleration control has been executed. An end condition may be judged as satisfied, for example, when the relative speed Vre is negative and the degree of approachability |Lre/Vre| relative to the preceding vehicle, etc. is larger than a reference value of ending the control LVree (a positive value larger than LVres). An interruption condition may be judged as satisfied when either of the following conditions is satisfied:

(1) Execution of a driver's acceleration action is judged based upon the accelerator opening Φ, detected with the accelerator opening sensor 40;
(2) Execution of a driver's braking action is judged based upon the master cylinder pressure Pm detected with the pressure sensor 38 or a signal from a stop lamp switch (not shown);
(3) The degree of approachability can not be normally calculated; and
(4) The preceding vehicle, etc. swerves from the front of the own vehicle because of, for example, the lane change of the own vehicle or preceding vehicle, etc.

In this connection, the automatic deceleration control is also interrupted when the preceding vehicle etc. is no longer detected in step 20.

When an end or interruption condition is satisfied, an end process for gradually decreasing the deceleration is carried out if the deceleration has a significant value (step 90).

Figure 3:
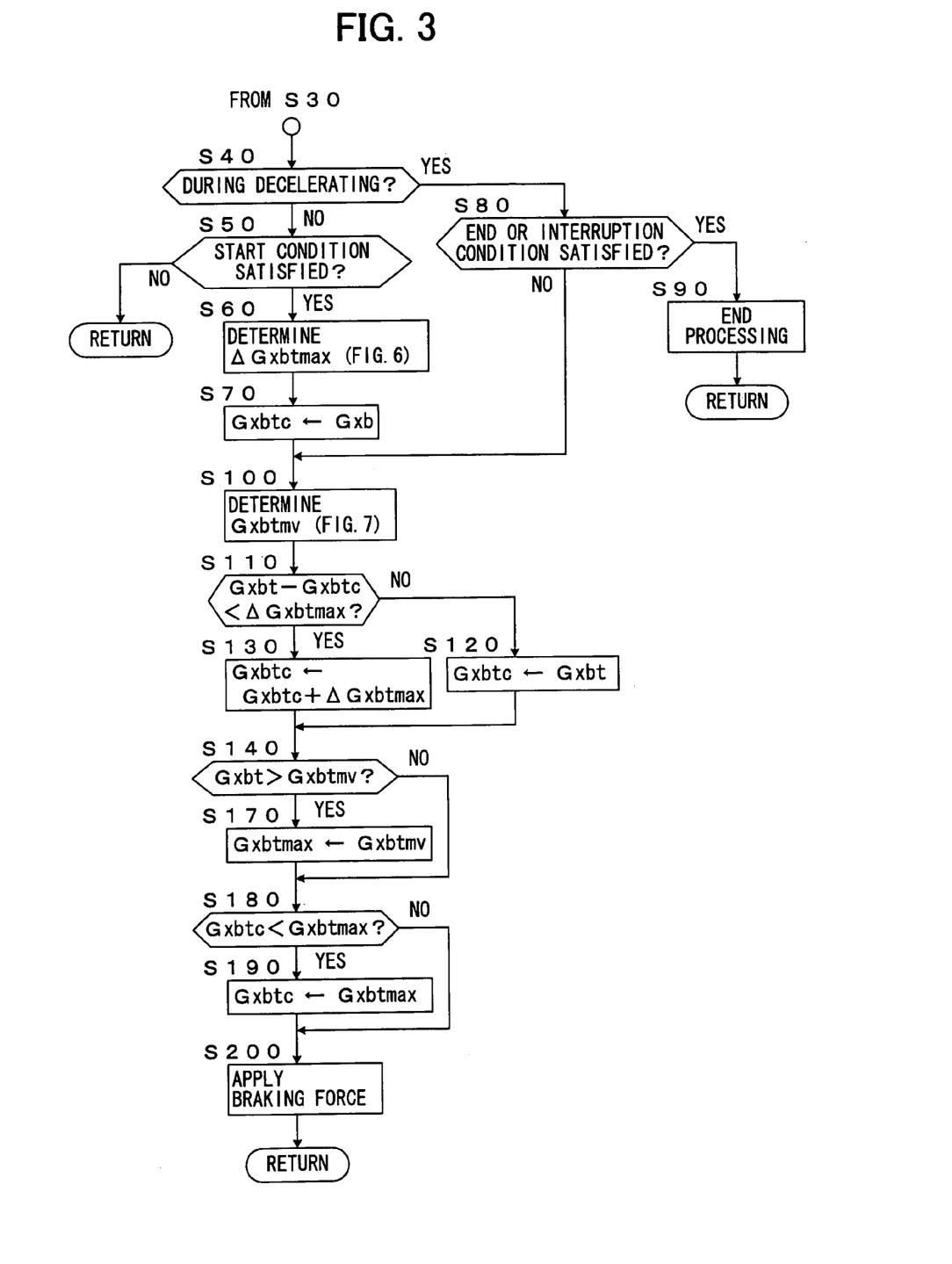
FIG. 3 is a flowchart showing a second exemplary deceleration control routine in a control device of an embodiment according to the present invention.
Figure 9:
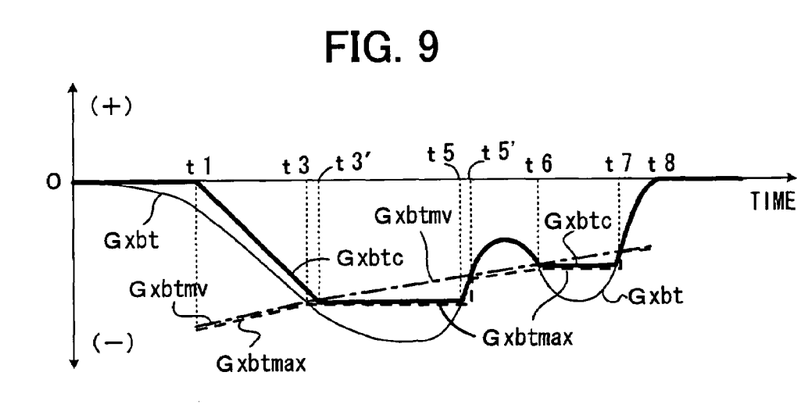
FIG. 9 shows an example of a time chart of a target deceleration, a control target deceleration, an allowable deceleration and a maximum allowable deceleration in the second control routine.

The flow chart in FIG. 3 shows the second exemplary control routine of the automatic deceleration control of the present invention, and FIG. 9 is a time chart example of a deceleration actually applied on the own vehicle under deceleration control in accordance with the control routine of FIG. 3. With reference to FIG. 9, in this control routine, first, a value of a deceleration suitable for suppressing a rapid change of a vehicle speed (hereinafter, referred to as an allowable deceleration Gxbtmv, indicated with a long and short dashed line in FIG. 6) is sequentially determined as a function of the vehicle speed V. Then, when a target deceleration Gxbt exceeds the allowable deceleration Gxbtmv (t3), the allowable deceleration Gxbtmv at that time is determined as a maximum allowable deceleration Gxbtmax, instead of determining and fixing the maximum allowable deceleration Gxbtmax at the time of starting automatic deceleration. That is, the time of the magnitude of the target deceleration exceeding the magnitude of the allowable deceleration is selected as when a predetermined condition is satisfied. The determined maximum allowable deceleration Gxbtmax is maintained at least while the magnitude of the target deceleration Gxbt is larger than the magnitude of the maximum allowable deceleration Gxbtmax (from t3 to t5). Then, when the magnitude of the target deceleration Gxbt falls down below the magnitude of the allowable deceleration Gxbtmv once (t5') and exceeds the magnitude of allowable deceleration Gxbtmv again (t6), the allowable deceleration Gxbtmv at that time (t6) is reset up as the new maximum allowable deceleration Gxbtmax. That is, whenever a magnitude of a target deceleration Gxbt exceeds a magnitude of an allowable deceleration Gxbtmv, i.e. whenever the target deceleration Gxbt crosses the allowable deceleration Gxbtmv into the negative direction, the allowable deceleration Gxbtmv at that time is set up as a maximum allowable deceleration Gxbtmax, which is maintained until the magnitude of the target deceleration Gxbt descends below the magnitude of the allowable deceleration Gxbtmv. A control target deceleration Gxbtc, actually demanded to the braking system is restricted to the maximum allowable deceleration Gxbtmax. Namely, the magnitude of the control target deceleration Gxbtc is actually restricted only while the magnitude of the target deceleration Gxbt is larger than the magnitude of the allowable deceleration Gxbtmv (t3'-t5 and t6-t7).

With reference to FIG. 3, in the second exemplary control routine, the processes in steps, designated the same reference numerals as steps in FIG. 2, are the same as in the corresponding steps in FIG. 2. Thus, in the followings, only the processes of FIG. 3, different from those in FIG. 2, will be explained about.

In step 60, only MAIG ΔGxbtmax is determined (FIG. 6). When the control target deceleration Gxbtc is not restricted to the maximum allowable deceleration Gxbtmax and the control target deceleration Gxbtc differs from the target deceleration Gxbt, the control target deceleration Gxbtc approaches to the target deceleration Gxbt at the rate corresponding to MAIG ΔGxbtmax.

Figure 7:
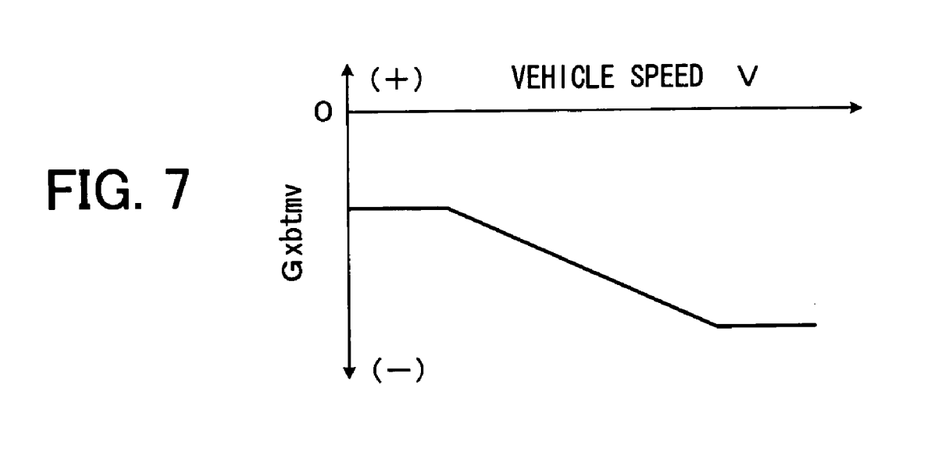
FIG. 7 shows the relation between a vehicle speed V and an allowable deceleration Gxbtmv (a map for determining the allowable deceleration Gxbtmv as a function of a vehicle speed V)

Further, in the second exemplary control routine, instead of determining a maximum allowable deceleration Gxbtmax in step 60, an allowable deceleration Gxbtmv is determined using the map of FIG. 7 every cycle (step 100). The determined allowable deceleration Gxbtmv is compared with the target deceleration Gxbt (step 140), and it is judged which of the target deceleration Gxbt and allowable deceleration Gxbtmv is larger. When the magnitude of the target deceleration Gxbt is smaller than the magnitude of the allowable deceleration Gxbtmv, i.e. Gxbt>Gxbtmv is satisfied (t1-t3, t5'-t6, t7-t8 in FIG. 9), the maximum allowable deceleration Gxbtmax formally varies in conformity with the allowable deceleration Gxbtmv (step 170). (In these periods, however, the maximum allowable deceleration Gxbtmax does not contribute to restricting the control target deceleration.) On the other hand, when Gxbt>Gxbtmv is not satisfied, step 170 will be bypassed, and consequently, the value of the maximum allowable deceleration Gxbtmax will be maintained at the value of the allowable deceleration Gxbtmv of the time when the magnitude of the target deceleration Gxbt reaches the magnitude of allowable deceleration Gxbtmv (t3, t6). In this connection, other algorithm may be used in which a maximum allowable deceleration Gxbtmax is set up when a target deceleration exceeds an allowable deceleration and a maximum allowable deceleration Gxbtmax is maintained until the magnitude of target deceleration becomes smaller than the magnitude of the allowable deceleration, whereby the control target deceleration is restricted to the maximum allowable deceleration. It should be understood that a case in which such an other algorithm is employed is within the scope of the present invention.

Consequently, in the second exemplary control routine, whenever a magnitude of a target deceleration exceeds a magnitude of an allowable deceleration, a limit value for deceleration will be determined based upon the current vehicle speed, thereby rendering the automatic deceleration control more suitable for suppressing a rapid change of vehicle speed.

Figure 4:
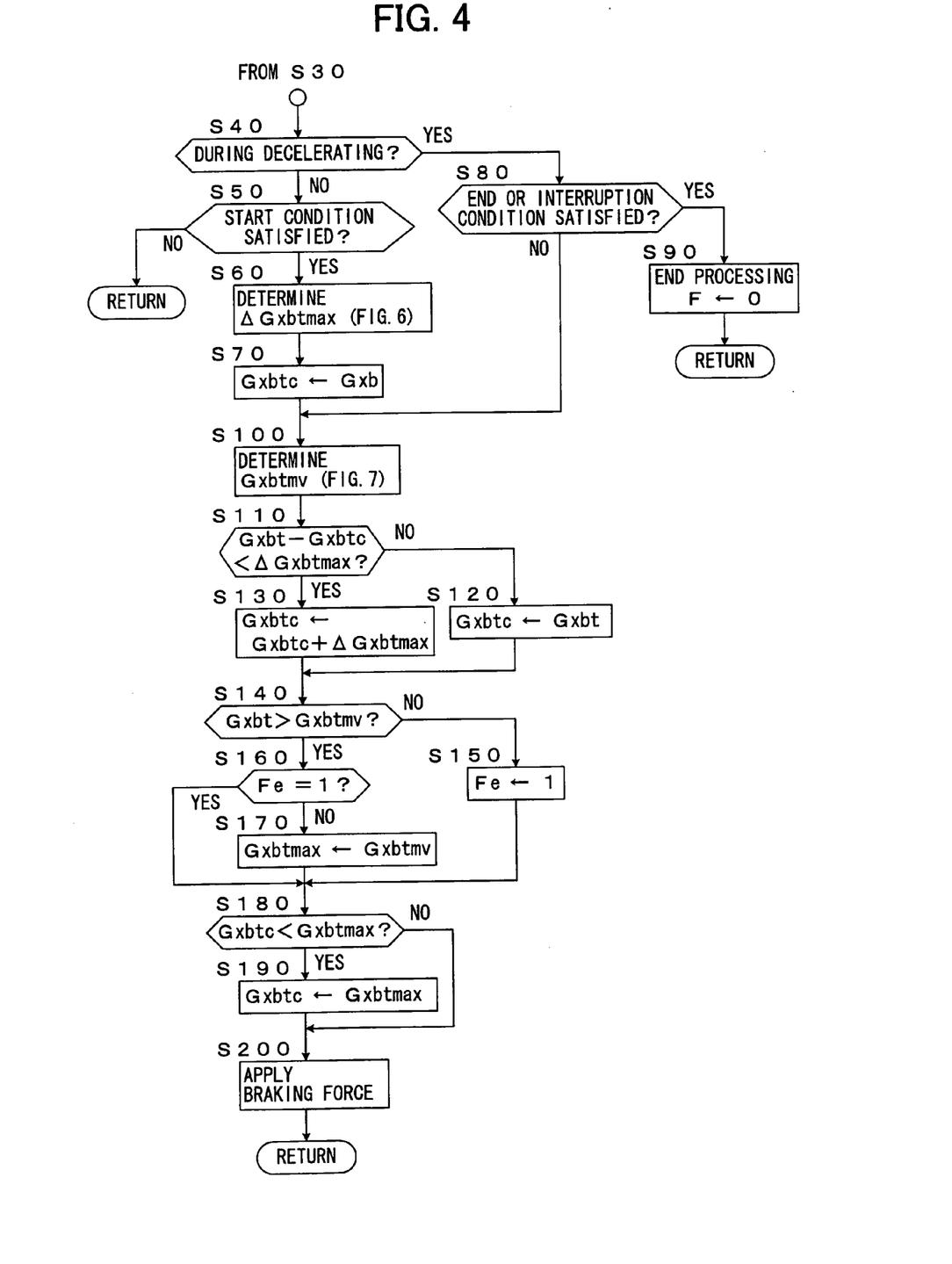
FIG. 4 is a flowchart showing a third exemplary deceleration control routine in a control device of an embodiment according to the present invention.
Figure 10:
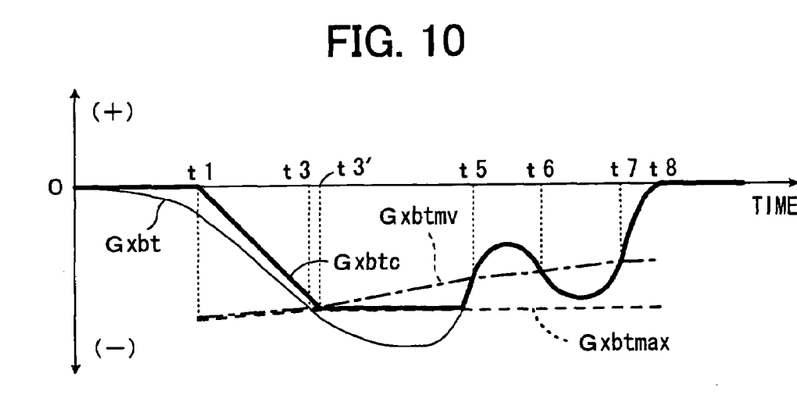
FIG. 10 shows an example of a time chart of a target deceleration, a control target deceleration, an allowable deceleration and a maximum allowable deceleration in the third control routine.

The flow chart in FIG. 4 shows the third exemplary control routine of the automatic deceleration control of the present invention, and FIG. 10 is a time chart example of a deceleration actually applied on the own vehicle under deceleration control in accordance with the control routine of FIG. 4. With reference to FIG. 10, in this control routine, an allowable deceleration Gxbtmv is sequentially determined as a function of the vehicle speed V. Then, a maximum allowable deceleration Gxbtmax is set to the allowable deceleration Gxbtmv when a target deceleration Gxbt exceeds the allowable deceleration Gxbtmv (t3) for the first time after the starting of automatic deceleration. That is, the first time of the magnitude of target deceleration exceeding the magnitude of the allowable deceleration after starting automatic deceleration is selected as when a predetermined condition is satisfied. The determined maximum allowable deceleration Gxbtmax is maintained until the end of the automatic deceleration control (t3-t8).

With reference to FIG. 4, in the third exemplary control routine, the processes in the steps, designated the same reference numerals as steps in FIG. 2, is the same as in the corresponding steps in FIG. 2. Thus, in the followings, only the processes, different from those in FIG. 2, will be explained about.

In step 60 of FIG. 4, as in FIG. 3, only MAIG ΔGxbtmax is determined (FIG. 6), and, in step 100, an allowable deceleration Gxbtmv is determined every cycle, using the map of FIG. 7. However, in this control routine, the maximum allowable deceleration Gxbtmax is fixed when a target deceleration Gxbt exceeds the allowable deceleration Gxbtmv for the first time. In other words, in the control cycles after the conditions: Gxbt≦Gxbtmv is satisfied, the maximum allowable deceleration Gxbtmax will be maintained. To do this, for instance, a flag Fe may be used, which flag is set to 0 initially and changed to 1 in response to the target deceleration reaching the allowable deceleration Gxbtmax,. In this case, as long as the condition: Gxbt>Gxbtmv is maintained in step 140 of FIG. 4, the flag Fe remains to be 0 so that the value of the maximum allowable deceleration Gxbtmax formally varies with the allowable deceleration Gxbtmv (step 170). Then, if the target deceleration Gxbt crosses the allowable deceleration Gxbtmv in the negative direction, the condition: Gxbt<Gxbtmv is established, and Fe will be set to 1 (step 150). Once Fe=1 is set up, step 170 is always bypassed irrespective of the result of step 140 in the subsequent cycles, and therefore the value of the maximum allowable deceleration Gxbtmax is fixed on the allowable deceleration Gxbtmv of the cycle just before Fe=1 was set up. At the end of the current automatic deceleration, Fe is reset to 0.

It should be noted that other algorithms may be used in which a maximum allowable deceleration Gxbtmax is fixed when a target deceleration exceeds an allowable deceleration for the first time after the start of automatic deceleration, and it should be understood that such a case is within the scope of the present invention.

By the way, in the above-described control routine, a changing rate or gradient of a control target deceleration is restricted to MAIG ΔGxbtmax. However, a control target deceleration may be rendered in conformity with a target deceleration, without restricting the gradient in the control target deceleration, when its magnitude is not to be restricted. Further, MAIG ΔGxbtmax may be a fixed value regardless of vehicle speed V. It should be understood that all of those cases are within the scope of the present invention.

Figure 11:
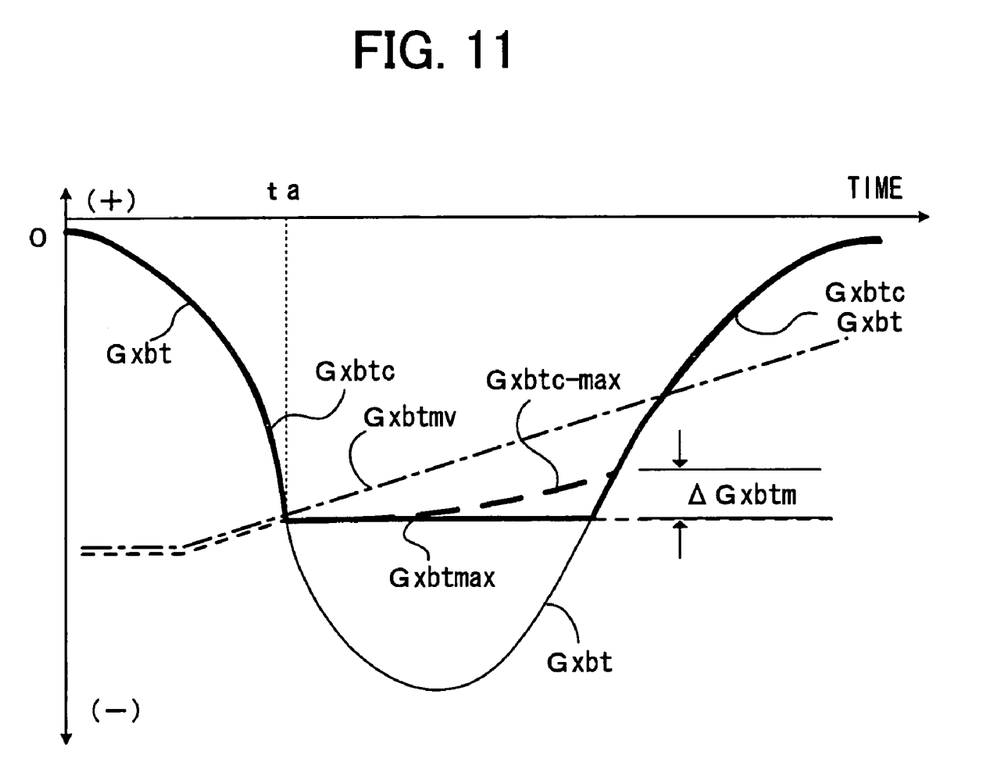
FIG. 11 shows an example of a time chart of a target deceleration, a maximum allowable deceleration, etc., in a modified control routine according to the present invention.

Moreover, in the above-described exemplary control routines, a maximum allowable deceleration Gxbtmax is kept at a constant value while a control target deceleration Gxbt is restricted to the maximum allowable deceleration Gxbtmax. However, it should be understood that, depending upon any parameters of vehicle running conditions, such as speed V, a maximum allowable deceleration Gxbtmax may vary within a range not contrary to an expectation of a driver for braking force available through automatic deceleration control. As shown in FIG. 11, a maximum allowable deceleration Gxbtmax, set up when a target deceleration Gxbt crosses the maximum allowable deceleration or allowable deceleration in the negative direction (ta), may vary as shown with Gxbtc-max with time, speed V and/or other parameters indicating any running conditions. Accordingly, in step 190 of FIG. 2-4, a control target deceleration Gxbtc may be set up as follows:

$$Gxbtc \leftarrow Gxbtmax \pm \Delta Gxbtm,$$

where ΔGxbtm may be the amount of change, which is a function of speed, time, etc., satisfying:

$$0 < \Delta Gxbtm < |Gxbtmax - Gxbtmv|.$$

The amplitude in the variation of a maximum allowable deceleration ΔGxbtm should be within a range not contrary to the expectation of a driver, and therefore it should be understood that the maximum allowable deceleration Gxbtc-max should not reach an allowable deceleration Gxbtmv. For example, to weaken braking force only by ΔGxbtm, depending upon vehicle speed, can ease a feeling of sudden deceleration, without impressing a driver with unexpected shortage of braking force.

Although the present invention has been described in detail with respect to preferred embodiments thereof and some partial modifications thereof, it will be apparent for those skilled in the art that other various modifications are possible with respect to the shown embodiments within the scope of the present invention.

The invention claimed is:

1. A vehicle deceleration control device judging automatic deceleration to be necessary based on a relative distance and a relative speed between its own vehicle and an object in front of the vehicle; calculating a target deceleration of the own vehicle based on the relative distance and the relative speed when the automatic deceleration is necessary; and decelerating the own vehicle automatically by controlling braking force to be applied on the own vehicle automatically, based on the target deceleration; said device comprising a speed detector for detecting a vehicle speed of the own vehicle and a maximum allowable deceleration setting portion setting up a maximum allowable deceleration based on the vehicle speed of the own vehicle when a predetermined condition is satisfied; and said device decelerating the own vehicle automatically by controlling braking force to be applied on the own vehicle automatically, based on the maximum allowable deceleration when a magnitude of the target deceleration is larger than a magnitude of the maximum allowable deceleration.

2. The vehicle deceleration control device of claim 1, wherein the maximum allowable deceleration is set up based on the vehicle speed of the own vehicle upon starting automatic deceleration.

3. The vehicle deceleration control device of claim 2, wherein the magnitude of the maximum allowable deceleration when the vehicle speed of the own vehicle is higher is larger than that when the vehicle speed of the own vehicle is lower.

4. The vehicle deceleration control device of claim 2, wherein the maximum allowable deceleration is allowed to vary within a predetermined range when the magnitude of the target deceleration is larger than the magnitude of the maximum allowable deceleration, and a width of the predetermined range is smaller than a magnitude of a difference between the maximum allowable deceleration set up based on the vehicle speed of the own vehicle upon the starting of the automatic deceleration and a maximum allowable deceleration set up based on a current vehicle speed of the own vehicle.

5. The vehicle deceleration control device of claim 1, wherein the maximum allowable deceleration setting portion sets the maximum allowable deceleration to an allowable deceleration determined based on the vehicle speed of the own vehicle when the magnitude of the target deceleration increases to the magnitude of the allowable deceleration for the first time after starting automatic deceleration.

6. The vehicle deceleration control device of claim 5, wherein a magnitude of the allowable deceleration when the vehicle speed of the own vehicle is higher is larger than that when the vehicle speed of an own vehicle is lower.

7. The vehicle deceleration control device of claim 5, wherein the maximum allowable deceleration is allowed to vary within a predetermined range when the magnitude of the target deceleration is larger than the magnitude of the maximum allowable deceleration, and a width of the predetermined range is smaller than a magnitude of a difference between a magnitude of the maximum allowable deceleration at the time of its setup, and a magnitude of the allowable deceleration set up based on a current vehicle speed of the own vehicle.

8. The vehicle deceleration control device of claim 1, wherein the maximum allowable deceleration setting portion sets the maximum allowable deceleration to an allowable deceleration determined based on the vehicle speed of the own vehicle when the magnitude of the target deceleration increases to the magnitude of the allowable deceleration.

9. The vehicle deceleration control device of claim 8, wherein the magnitude of the allowable deceleration when the vehicle speed of the own vehicle is higher is larger than that when the vehicle speed of an own vehicle is lower.

10. The vehicle deceleration control device of claim 8, wherein the maximum allowable deceleration is allowed to vary within a predetermined range when the magnitude of the target deceleration is larger than the magnitude of the maximum allowable deceleration, and a width of the predetermined range is smaller than a magnitude of a difference between a magnitude of the maximum allowable deceleration at the time of its setup, and a magnitude of the allowable deceleration set up based on a current vehicle speed of the own vehicle.

11. The vehicle deceleration control device of claim 1, further comprising a portion setting up a maximum allowable incremental gradient of a magnitude of a deceleration based on the vehicle speed of the own vehicle upon starting deceleration of the own vehicle through automatic control of braking force; and a portion modifying the target deceleration to render an incremental gradient of the target deceleration equal to the maximum allowable increment gradient when the magnitude of the incremental gradient of the magnitude of the target deceleration is larger than the magnitude of the maximum allowable increment gradient, whereby the own vehicle is automatically decelerated by automatically controlling braking force to be actually applied on the own vehicle based on the modified target deceleration.

12. The vehicle deceleration control device of claim 11, wherein a magnitude of the maximum allowable increment gradient when the vehicle speed of the own vehicle is higher is larger than that when the vehicle speed of the own vehicle is lower.

13. The vehicle deceleration control device of claims 1, wherein the automatic control of braking force is prohibited when a predetermined action by a driver is detected.

14. The vehicle deceleration control device of claim 13, wherein the predetermined action by the driver includes an acceleration action and a braking action.

* * * * *